(12) United States Patent
Casassa Mont et al.

(10) Patent No.: US 10,764,393 B2
(45) Date of Patent: Sep. 1, 2020

(54) DETERMINING A PERSISTENT NETWORK IDENTITY OF A NETWORKED DEVICE

(71) Applicant: Hewlett Packard Enterprise Development LP, Houston, TX (US)

(72) Inventors: Marco Casassa Mont, Bristol (GB); Yolanta Beresna, Bristol (GB); Simon Ian Arnell, Aldershot (GB); Nipun Balan Thekkummal, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 77 days.

(21) Appl. No.: 16/061,998

(22) PCT Filed: Apr. 21, 2016

(86) PCT No.: PCT/US2016/028563
§ 371 (c)(1),
(2) Date: Jun. 13, 2018

(87) PCT Pub. No.: WO2017/184139
PCT Pub. Date: Oct. 26, 2017

(65) Prior Publication Data
US 2018/0375953 A1    Dec. 27, 2018

(51) Int. Cl.
*H04L 29/08*     (2006.01)
*H04L 12/46*     (2006.01)
(Continued)

(52) U.S. Cl.
CPC ............ *H04L 67/303* (2013.01); *H04L 12/28* (2013.01); *H04L 12/4625* (2013.01);
(Continued)

(58) Field of Classification Search
CPC ... H04L 67/303; H04L 12/28; H04L 12/4625; H04L 41/0213; H04L 61/1588; H04L 61/2015; H04L 61/6022; H04L 61/2053
See application file for complete search history.

(56) References Cited

U.S. PATENT DOCUMENTS 6,701,324 B1    3/2004   Chochran et al.
7,536,450 B2    5/2009   Motoyama et al.
(Continued)

FOREIGN PATENT DOCUMENTS

WO    WO-2014098902 A1 *  6/2014

OTHER PUBLICATIONS

Cisco, "Cisco, Indentity Services Engine", available online at <https://web.archive.org/web/20180123143808/https://www.cisco.com/c/en/us/products/security/identity-services-engine/index.html>, Jan. 23, 2018, 15 pages.
(Continued)

*Primary Examiner* — Jeffrey R Swearingen
(74) *Attorney, Agent, or Firm* — Hewlett Packard Enterprise Patent Department

(57) ABSTRACT

The present disclosure relates to a network device that determines a persistent network identity for a networked device. Specifically, the network device receives a service request that includes an identifier for a second network device in a sub-network among a plurality of sub-networks. The identifier uniquely corresponds to the second network device during a limited period of time. At least one sub-networks are unreachable by the service request. The network device aggregates partial networked device profiles corresponding to the second network device received from other network devices in at least the at least one sub-networks to generate a networked device profile. Moreover, the network device searches at least one caches to obtain the
(Continued)

networked device profile based on the identifier in the service request, and correlates the identifier to a persistent network identity corresponding to the second network device based on the networked device profile.

13 Claims, 9 Drawing Sheets

(51) Int. Cl.
*H04L 12/28* (2006.01)
*H04L 29/12* (2006.01)
*H04L 12/24* (2006.01)

(52) U.S. Cl.
CPC ...... *H04L 41/0213* (2013.01); *H04L 61/1588* (2013.01); *H04L 61/2015* (2013.01); *H04L 61/6022* (2013.01); *H04L 61/2053* (2013.01)

(56) References Cited

U.S. PATENT DOCUMENTS

| | | | |
|---|---|---|---|
| 8,880,664 B1 | 11/2014 | Tekle et al. | |
| 8,930,402 B1 | 1/2015 | Singh | |
| 9,894,099 B1* | 2/2018 | Jacobsen | H04L 63/20 |
| 10,091,312 B1* | 10/2018 | Khanwalkar | H04L 67/22 |
| 2005/0010660 A1 | 1/2005 | Vaught | |
| 2005/0097193 A1* | 5/2005 | Rhoda | H04L 41/046 |
| | | | 709/220 |
| 2007/0067444 A1* | 3/2007 | McCarty | H04L 67/14 |
| | | | 709/224 |
| 2007/0283194 A1* | 12/2007 | Villella | G06F 11/3476 |
| | | | 714/57 |
| 2008/0060071 A1* | 3/2008 | Hennan | H04L 63/1416 |
| | | | 726/22 |
| 2009/0245114 A1 | 10/2009 | Vijayaraghavan | |
| 2010/0172266 A1* | 7/2010 | Piccinini | H04L 29/12839 |
| | | | 370/254 |
| 2011/0185055 A1* | 7/2011 | Nappier | H04L 63/1433 |
| | | | 709/224 |
| 2012/0188087 A1* | 7/2012 | Wang | G06Q 50/01 |
| | | | 709/224 |
| 2012/0246303 A1* | 9/2012 | Petersen | G06F 16/1734 |
| | | | 709/224 |
| 2013/0067062 A1* | 3/2013 | Gaitonde | H04L 61/103 |
| | | | 709/224 |
| 2013/0318604 A1* | 11/2013 | Coates | H04L 63/1416 |
| | | | 726/22 |
| 2014/0053265 A1* | 2/2014 | Crowley | H04L 67/303 |
| | | | 726/22 |
| 2014/0074928 A1 | 3/2014 | B'Far et al. | |
| 2014/0095320 A1 | 4/2014 | Sivaramakrishnan et al. | |
| 2014/0258296 A1* | 9/2014 | Chen | H04L 43/022 |
| | | | 707/737 |
| 2015/0019547 A1 | 1/2015 | Thalapathy et al. | |
| 2015/0235275 A1 | 8/2015 | Shah et al. | |
| 2015/0319669 A1* | 11/2015 | Koornstra | H04L 12/4633 |
| | | | 370/329 |
| 2016/0366040 A1* | 12/2016 | Nampelly | H04L 43/12 |
| 2017/0195446 A1* | 7/2017 | Lyengar | H04L 67/2828 |
| 2017/0279829 A1* | 9/2017 | Vasseur | H04L 41/0893 |

OTHER PUBLICATIONS

Leidos, "Hewlett Packard Enterprise ArcSight ESM Security Target", Version 1.3, June, 13, 2017, 48 pages.
Wikipedia, "Simple Network Management Protocol (SNMP)", available online at <https://en.wikipedia.org/w/index.php?title=Simple_Network_Management_Protocol&oldid=822535606>, Jan. 26, 2018, 13 pages.
International Searching Authority, The International Search Report and the Written Opinion, dated Jan. 19, 2017, PCT/US2016/028563, 11 Pgs.
Cisco: Introduction to Cisco NAC Profiler; http://www.cisco.com/c/en/us/td/docs/security/nac/profiler/configuration_guide/311/Profiler311I-C/p_intro31.html; Mar. 16, 2020, 5 pages.

* cited by examiner

DETERMINING A PERSISTENT NETWORK IDENTITY OF A NETWORKED DEVICE

BACKGROUND

Computing devices are often connected over networks. A networked device can be identified by various identifiers. Network identifiers, such as Internet Protocol (IP) addresses, are used to ensure the security of a network and related resources. As such, network identifiers are significant for management of data, applications, devices, equipment, etc. Generally, network identifiers change over time.

BRIEF DESCRIPTION OF THE DRAWINGS

The following detailed description references the drawings, wherein.

DETAILED DESCRIPTION

Figure 1:
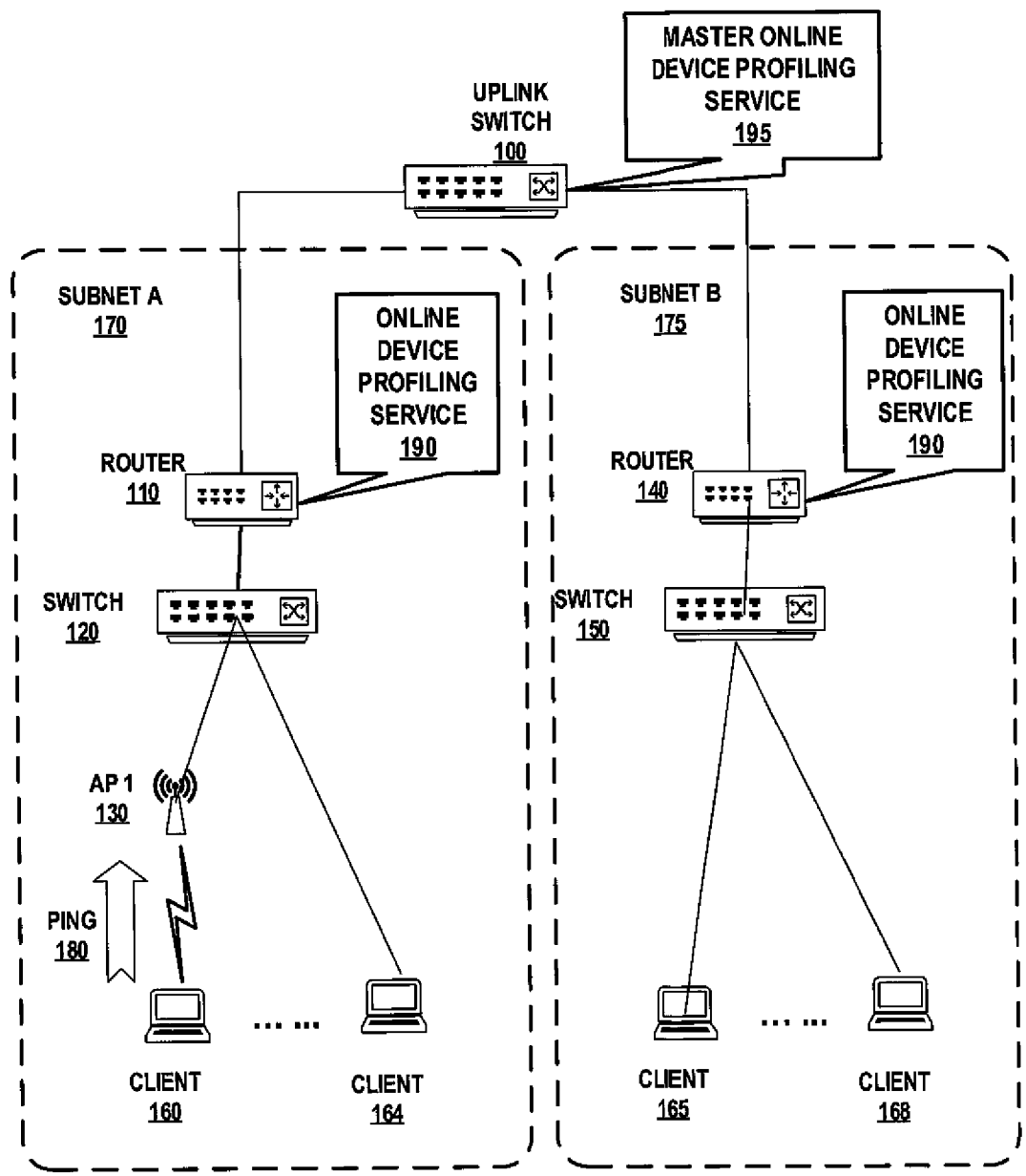
FIG. 1 is a block diagram of an example networking environment using online device profiling services for networked devices.

In the following description, several specific details are presented to provide a thorough understanding. While the context of the disclosure is directed to profiling networked devices, one skilled in the relevant art will recognize, however, that the concepts and techniques disclosed herein can be practiced without at least one of the specific details, or in combination with other components, etc. In other instances, implementations or operations are not shown or described in details to avoid obscuring aspects of various examples disclosed herein. As used herein, the term "implementation" generally refers an implementation that serves to illustrate by way of example but not limitation. It should be understood that this disclosure covers all modifications, equivalents, and alternatives falling within the spirit and scope of the present disclosure.

Overview

Currently, identifiers of networked devices (e.g., Internet Protocol (IP) addresses) cannot be reliably tracked over a long period of time across multiple sub-networks in a network. An IP address allocated to a particular networked device by a dynamic host configuration protocol (DHCP) is valid for a limited period of time, and then is reused by a different networked device. As a result, data analytics cannot be effectively performed without consistent references to device identities. Complex solutions can be deployed to track device identities over time by integrating various tools, data feeds, and packages. However, they introduce dependencies and increase costs.

The present disclosure relates to networked device management. In particular, the present disclosure relates to identifying and profiling networked devices over a long period of time. Specifically, networked devices are often referenced using their Internet Protocol (IP) addresses or hostnames by event logs for analytical correlations, security threat detection and remediation, etc. Nonetheless, the IP addresses are volatile because allocation of IP addresses by dynamic host configuration protocol (DHCP) usually is associated with limited period of lease time. Moreover, multi-homed devices, such as laptops and virtual servers, may have multiple IP addresses. As such, it is difficult to use a single identifier to uniquely identify a particular networked device over time. Therefore, the present disclosure describes an architecture that provides reliable references to networked devices with a persistent network identity.

With the solution provided herein, a network device receives a service request that includes an identifier for a networked device via an application programming interface (API) from a big data consumer. The API can be based on pull requests or on a subscriber/notified basis. The identifier uniquely corresponds to the second network device during a limited period of time. Then, the network device searches at least one hierarchical caches to obtain a networked device profile based on the identifier in the service request. Note that the networked device profile is built over time by collecting and analyzing diverse data associated with the networked device. The networked device profile may also include metadata, e.g., by carrying out data correlations and inferences. Next, the network device determines a persistent network identity corresponding to the networked device based on the identifier, as well as the metadata if applicable, and the networked device profile. Thereafter, the network device responds to the service request with the persistent network identity. Here, the networked device generally refers to any device connected to a network. In this manner, the examples described herein allow for determining a persistent network identity and using the persistent network identity across multiple sub-networks over a long time. The network device refers to a purposely built computing device that provides profiling service to networked devices.

Computing Environment

FIG. 1 is a block diagram of an example networking environment for networked devices. Specifically, for illustration purposes only, FIG. 1 includes at least two sub-networks in a network, namely, Sub-network A 170 and Sub-network B 175. Sub-network A 170 includes at least a router 110, a plurality of switches (e.g., switch 120), a plurality of network management devices (e.g., AP 1 130), and a plurality of client devices (e.g., Client 160 to Client 164). Similarly, Sub-network B 175 includes at least a router 140, a plurality of switches (e.g., switch 150), and a plurality of client devices (e.g., Client 165 to Client 168). Note that, although not shown in FIG. 1, other types of networking components, such as, DHCP servers, firewalls, etc., can provide identifier information for networked device profiling as well. Moreover, Sub-network A 170 and Sub-network B 175 are partitioned from a network and interconnected by an uplink switch 100.

A router (e.g., router 110 or 140) generally refers to a network management device that determines the next network point to which a packet should be forwarded toward its destination. The router is connected to at least two networks (or sub-networks) and decides which way to send each packet based on the current state of the networks (or sub-networks) it is connected to. A router is located at a gateway where one network meets another, and is often included as part of a network switch. Therefore, router 110 and switch 120 may be included in the same network device. Likewise, router 140 and switch 150 may be included in the same network device. Moreover, a router can create or maintain a table of the available routes and their conditions, and use this information along with distance and costs to determine the best route for a given packet. Typically, a packet may travel through a number of network points with routers before arriving at its destination.

Here, a sub-network (also referred to as "subnet") generally refers to a logical, visible subdivision of an IP network. A router generally constitutes the logical or physical boundary between the sub-networks. Traffic is exchanged between sub-networks with special gateways when the routing prefixes of the source address and the destination address differ. If no gateway is configured in a network system, when a networked device (e.g., Client 160) in one sub-network (e.g., Sub-network A 170) attempts to reach another device (e.g., Client 165) in another sub-network (e.g., Sub-network B 175) by transmitting a ping message 180, ping message 180 would fail. As a result, a networked device in a sub-network can obtain merely IP addresses and hostnames for other networked devices located within the same sub-network. The networked device usually cannot obtain IP addresses and hostnames for networked devices located in a different sub-network. Such design promotes security between different sub-networks of the IP network, but it also makes it difficult for event logs to be analyzed due to lack of persistent network identities for networked devices in a sub-network.

According to the present disclosure, an online device profiling service (e.g., online device profiling service 190) would be deployed in each sub-network in an IP network. The online device profiling services could communicate with a master online device profiling service 195. Without compromising security and allowing devices in sub-networks to communicate directly to each other (e.g., via a ping message), master online device profiling service 195 can aggregate partial network profiles collected by online device profiling service 190 in each of the sub-networks. Moreover, online device profiling service 190 can identify a persistent network identity for each device in a sub-network, and use the persistent network identities to reference networked devices across multiple sub-networks over a long period of time.

Networked Device Profile

Figure 2:
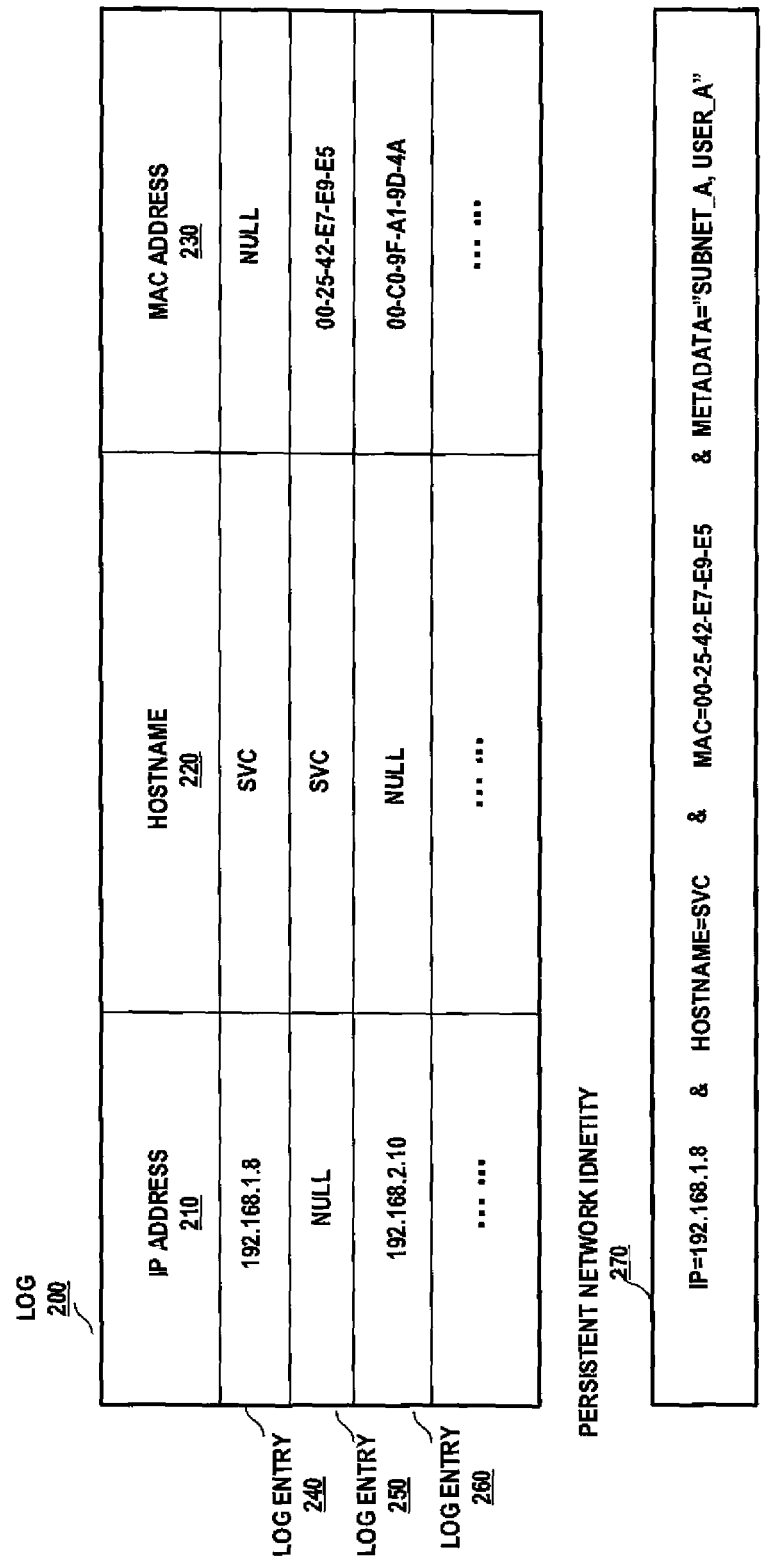
FIG. 2 is a block diagram of an example partial networked device profile log used to generate a persistent network identity.

FIG. 2 is a block diagram of an example partial networked device profile log. In this example, a partial networked device profile is derived from a log 200. Log 200 includes at least the following fields: an IP address 210, a hostname 220, and a Media Access Control (MAC) address 230.

IP address 210 generally refers to a numerical label assigned to each networked device (e.g., a computer, a printer) participating in a network that uses the Internet Protocol for communication. An IP address serves two principal functions: (1) host or network interface identification, and (2) location addressing. IP address 210 may be a 32-bit number as in Internet Protocol Version 4 (IPv4), or a 128-bit number as in Internet Protocol Version 6 (IPv6).

Hostname 220 generally refers to a label that is assigned to a networked device to identify the networked device in various forms of electronic communications, such as, the World Wide Web (WWW). Hostnames may be simple names comprising a single word or phrase, or they may be structured names. For example, on the Internet, hostnames may have appended the name of a Domain Name System (DNS) domain, separated from the host-specific label by a period ("dot").

MAC address 230 generally refers to a unique identifier assigned to network interfaces for communications on the physical network segment. MAC addresses are most often assigned by the manufacturer of a network interface controller (NIC) and are stored in its hardware, such as the card's read-only memory or some other hardware. However, a networked device may have multiple NICs, and thus each NIC has its unique MAC address.

Note that other fields may also present in log 200. The other fields may or may not identifying a networked device. In some cases, they may partially identify a networked device. In some cases, they may identify a networked device for a limited period of time.

Log 200 in FIG. 2 is an example partial networked profile collected by a variety of data collection tools. In this example, log entry 240 includes an IP address of 192.168.1.8 and a hostname of SVC. However, log entry 240 does not include a corresponding MAC address for the respective networked device. Similarly, log entry 250 includes a hostname of SVC and a MAC address of 00-25-42-E7-E9-E5. However, log entry 250 does not include a corresponding IP address for the respective networked device. Moreover, log entry 260 includes an IP address of 192.168.2.10 and a MAC address of 00-C0-9F-A1-9D-4A. However, log entry 260 does not include a corresponding hostname for the respective networked device.

According to the present disclosure, an online device profiling service would analyze diverse data collected by different data collection tools. The diverse data may present to the online device profiling service in different formats via different interfaces. The log entries including the diverse data may be partial or complete.

The online device profiling service may aggregate the diverse data into networked device profiles. In some implementations, a networked device profile may include a plurality of events related to a single networked device. In some implementations, a networked device profile may include events related to multiple networked devices in the same sub-network. In some implementations, a networked device profile may include events related to multiple networked devices across multiple sub-networks. In some implementations, a networked device profile may include events related to a single networked device across multiple sub-networks.

Moreover, a networked device profile may include at least one device identifiers. The at least one device identifiers may be partial or complete. They may or may not uniquely identify a networked device. Where applicable, the networked device profile includes a persistent network identity (e.g., persistent network identity 270) that uniquely identifies the networked device across multiple sub-networks over a long period of time. The persistent network identity may be a string, a large number, a hash value, or in any other format that can be scaled to identify a large number of networked devices.

Further, a networked device profile may also include additional metadata. This metadata can include any sort of additional information, for example, the very first appearance of a particular networked device in the network (e.g. based on MAC address); statistics on variability of the IP addresses and host names associated with a particular networked device over a predefined time period, the geo-locations associated with a particular networked device in a predefined time period (by correlating against a geo-database), etc. As such, beyond aggregated data from collected diverse data, the networked device profile is also built based on inferred data by using analytical modules provided by the online device profiling service.

Online Device Profiling Service Architecture

Figure 3:
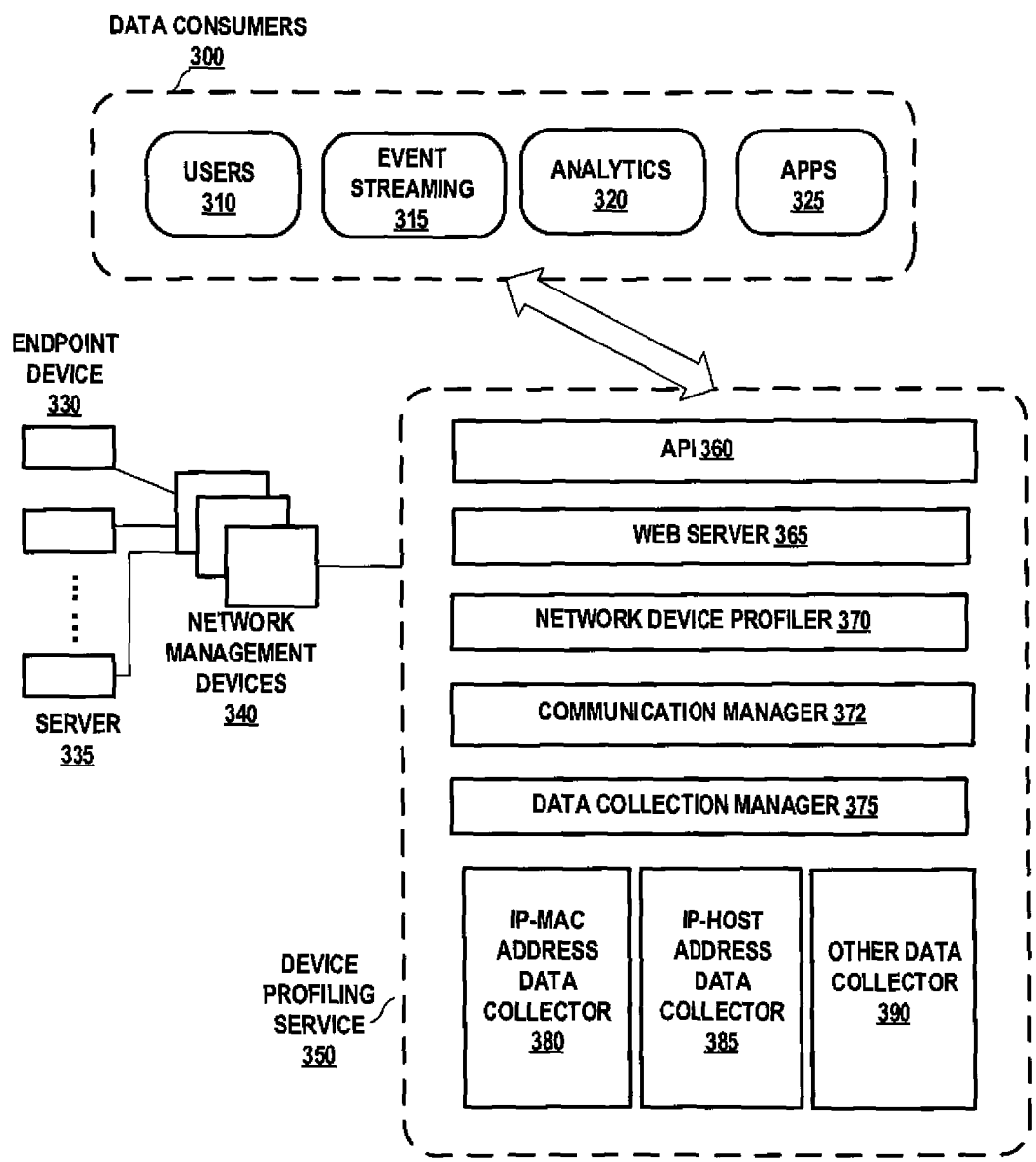
FIG. 3 is a block diagram of an example architecture for an online device profiling service.

FIG. 3 is a block diagram of an example architecture for an online device profiling service. Specifically, FIG. 3 includes at least a device profiling service 350, a plurality of data consumers 300, and a plurality of network management devices 340. Device profiling service 350 communicates to network management devices 340 and provides services to data consumers 300.

Data consumers 300 generally refer to any kind of entities, devices, and/or applications that request information related to networked devices in at least one sub-networks managed by network management devices 340. For example, data consumers 300 may be users 310, event streaming tools 315, analytics 320, applications 325, etc. More specifically, users 310 may request information about networked devices based on certain criteria. Event streaming tools 315 may request information about networked devices to further annotate events in an event log. Analytics 320 may request access to historical information and/or real-time information about networked devices to perform data analytics functions. Likewise, applications 325 may need to enrich information about the networked devices.

Network management devices 340 generally refer to any device that provides network connectivity for networked devices in a network infrastructure, for example, switches, routers, firewalls, etc. Thus, network management devices 340 are connected to a plurality of networked devices, including but not limited to, endpoint device 330 and server 335.

Device profiling service 350 is a modular and extensible service module. Device profiling service 350 generally tracks and profiles networked devices over a long period of time. Specifically, device profiling service 350 includes at least an application programming interface (API) 360 (e.g., a pulling API, a publisher/subscriber API, etc.), a web server 365, a network device profiler 370, a communication manager 372, a data collection manager 375, and a plurality of data collectors, such as, IP-MAC address data collector 380, IP-host address data collector 385, and other data collectors 390. Furthermore, an analytical engine within network device profiler 370 is tasked to analyse and compute additional profiling metadata information for each networked device, in addition to aggregating diverse data collected for each networked device.

API 360 provides an interface for data consumers 300 to communicate with device profiling service 350. Different types of APIs are supported by API 360, including but not limited to, pulling APIs, publisher/subscriber APIs, etc. Web server 365 provides web services to data consumers 300. Communication manager 372 handles API communications in general. Communication manager 372 includes at least a notification handler component, which handles publisher-subscriber communications in particular. According to the present disclosure, device profiling service 350 communicates with two storage systems that respectively store current information available for networked devices (e.g., IP address, MAC address, hostname, metadata, etc.) and historical information available for networked devices. Particularly, note that the two storage systems include additional analytical metadata information associated with networked devices over time. The content of the storage systems can be accessed via web services or web APIs. In particular, the networked device profiles and device identification information (e.g., persistent device identities) can be retrieved via web API 360, which accesses and returns either current cached information or historical information based on the needs of data consumers 300.

In some implementations, API 360 receives a service request that includes a device identifier, such as, an IP address, a MAC address, a hostname, or any additional metadata information, as an input. If the service request is about current data, web server 365 returns the available cached information matching the input data. For example, given an IP address, web server 365 returns the MAC address and hostname that is currently associated with the given IP address. If no matching MAC address or hostname is found for the given IP address, web server 365 further makes a runtime attempt to retrieve this data by interacting with a workflow engine module. On the other hand, if the service request is about historical data, web server 365 further receives specifications of a timestamp and/or time interval. Web server 365 then searches in the historical database and returns any related device information from the historical database.

In some implementations, API 360 offers service for bulk information retrieval. For example, API 360 can receive a service request that includes a list of devices. Web server 365 then searches the real-time cache and/or historical cache to retrieve all stored device information related to any networked device in the list of devices. Depending on the service request received by API 360, web server 365 may also search cached information for a given period of time. If no list is provided to API 360 but bulk data is requested in the server request, web server 365 returns the entire content of the current cache and the historical database. The bulk data functionality enhances user interactions and reduces the number of web requests. For example, in the context of event streaming scenarios, web server 365 may retrieve the full available device profiling information. Event streaming tools 315 can use such information to annotate logged events. In some implementations, the networked device profiles are retrieved during the data collection phase as data collection manager 375 collects diverse data and network device profiler 370 builds networked device profiles.

In some implementations, API 360 allows a data consumer to register their interests in a particular IP address, hostname, and/or MAC address. Then, API 360 could create an entry in a notification handler component, a component of communication manager 372 that would notify the registered data consumer in real-time of any updates to a device associated with a given IP, hostname, and/or MAC address. For example, in some cases, a data consumer could register its interests in changes to a device associated with an {IP address, hostname, MAC address} tuple. Accordingly, the data consumer would receive all changes to a device corresponding to a particular IP address. As another example, a data consumer might want to register interests in just changes for a device associated with a given MAC address and hostname, such that the data consumer can receive a filtered set of notifications where just the IP address for a MAC and hostname pair has changed. Thus, where the device is a multi-homed host, the data consumer can register to be notified of changes to just one interface on the multi-homed host device. In addition, when registering a request for notifications, a data consumer can specify a time window (e.g., within the next hour, or until infinity). Such configuration data is also persistently stored in the storage.

Data collection manager 375 generally coordinates collection of data about networked devices within a network or organization on an ongoing basis. In the example shown in FIG. 3, data collection manager 375 supports a plug-and-play approach, where different data collection engines can be deployed. Two example data collection engines are included in device profiling service 350, namely, IP-MAC address data collector 380 and IP-host address data collector 385.

Specifically, for each reachable networked device, IP-MAC address data collector 380 collects the IP address and MAC address of the networked device by using Simple Network Management Protocol (SNMP). IP-MAC address data collector 380 relies on the widely adopted SNMP agents deployed within network components, such as, routers, switches, firewalls, etc. An SNMP manager in IP-MAC address data collector 380 communicates securely with the SNMP agents deployed in local network components and collects the IP address and MAC address of networked devices from their local Management Information Bases (MIBs), The SNMP manager can poll the local SNMP agents by using community identification keys, e.g., by using ipNetToPhysicalPhysAddress or ipNetToMediaPhysAddress to poll for the IP address and/or MAC address of networked devices. IP-MAC address data collector 380 then aggregates the collected IP address and/or MAC address information and returns the results to data collection manager 375.

Moreover, IP-host address data collector 385 can also be deployed as a data collection engine as an alternative to or in addition to IP-MAC address data collector 380. For each reachable networked device, IP-host address data collector 385 retrieves the hostnames associated with the IP addresses of networked devices by using, e.g., nslookup tools. Data collection manager 375 can also work with other data collector 390 that use other similar tools to collection different forms of identifying information about networked devices.

Depending on the type of data collected, data collection manager 375 can store the collected networked device profile information in either a real-time cache or a historical database. To keep content of the real-time cache current, data collection manager 375 periodically migrates a subset of networked device profile information from the real-time cache to the historical database, and associates the migrated information with timestamps or time intervals that correspond to past time periods.

Network device profiler 370 is described in details in the section below with reference to FIG. 5. It shall be noted that network device profiler 370 includes an analytical engine that, besides the aggregation of {IP address, MAC address, hostname} information, can add any types of metadata to a device profile, e.g., by carrying out data correlations and inferences. This metadata support for data correlations and inferences not only applies to analytical functionalities, but also applies to information stored in the real-time cache or historical database.

Device profiling service 350 may be implemented by machine-readable instructions executable by at least one processor of a computing device (e.g., a server, a data center, a router, a switch, a controller, a storage, etc.), by circuitry of a computing device, or a combination thereof.

Deployment of Online Device Profiling Service

Figure 4:
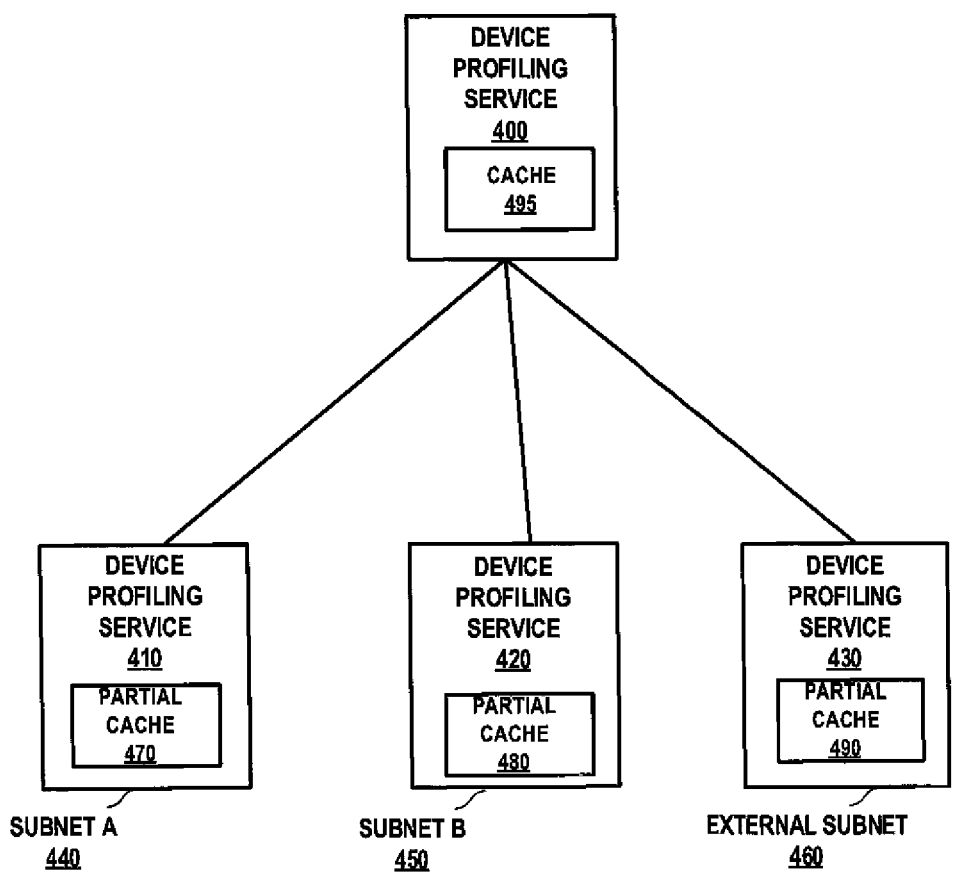
FIG. 4 is a block diagram of an example deployment of online device profiling services.

FIG. 4 is a block diagram of an example deployment of online device profiling services. As mentioned above, the online device profiling service is modular and extensible. FIG. 4 illustrates an example hierarchical deployment of the online device profiling services. Specifically, FIG. 4 includes at least a device profiling service 400, a device profiling service 410, a device profiling service 420, and a device profiling service 430. Although four distinct device profiling services are included in this example, a system according to the present disclosure may include any number of device profiling services. The system may be implemented by machine-readable instructions executable by at least one processor of a computing device (e.g., a server, a data center, a router, a switch, a controller, a storage, etc.), by circuitry of a computing device, or a combination thereof.

Here, device profiling service 400 is deployed as a master service, which periodically interacts with a plurality of locally deployed device profiling services. For example, device profiling service 410 is locally deployed to Sub-network A 440; device profiling service 420 is locally deployed to Sub-network B 450; and, device profiling service 430 is locally deployed to an external sub-network 460.

Although only one device profiling service is deployed to each sub-network in this example, it is possible to deploy more than one instances of device profiling services in a single sub-network. In some implementations, each of the multiple locally deployed device profiling services in a single sub-network communicates with the master service (e.g., device profiling service 400). In some implementations, the multiple locally deployed device profiling services may be deployed in a similar hierarchy, where a local master service communicates with all other local device profiling services within the same sub-network. The local master service also communicates with the master service (e.g., device profiling service 400) in the same manner as device profiling service 410.

Note that each device profiling service includes a cache. When a device profiling service is deployed locally to a particular sub-network, the cache is generally a partial cache that stores partial networked device profiles. For example, device profiling service 410 includes a partial cache 470; device profiling service 420 includes a partial cache 480; and, device profiling service 430 includes a partial cache 490. On the other hand, when a device profiling service is deployed as a master service, the cache is generally a global cache that includes full networked device profile information. For example, device profiling service 400 acting as a master service in FIG. 3 includes a global cache 495. Periodically, device profiling service 400 synchronizes with local device profiling services (e.g., device profiling service 410-430) to update the content of cache 495 using networked device profile information retrieved from partial caches (e.g., partial cache 470-490).

Network Device Profiler

Figure 5:
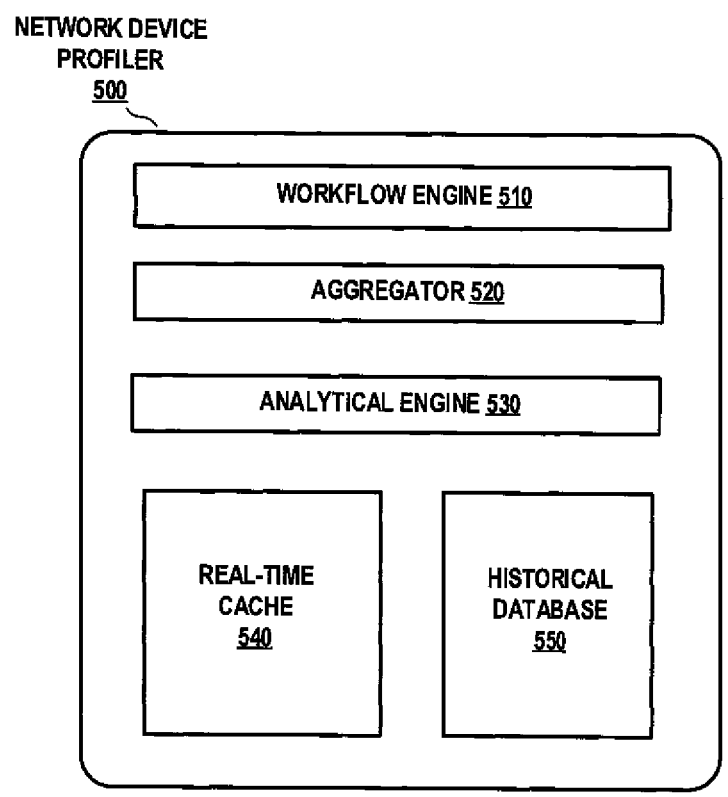
FIG. 5 is a block diagram of an example network device profiler.

FIG. 5 is a block diagram of an example network device profiler 500. Specifically, network device profiler 500 includes at least a workflow engine 510, an aggregator 520, and an analytical engine 530. Moreover, network device profiler 500 also includes a real-time cache 540 and a historical database 550. In general, network device profiler 500 coordinates the activities of data collection manager and further processes the collected data.

Workflow engine 510 generally refreshes real-time cache 540 and historical database 550. In some implementations, workflow engine 510 is coupled with a scheduler and periodically update the current information in real-time cache 540 and historical information in historical database 550 according to a predetermined schedule. In some implementations, workflow engine 510 can update the networked device profile information on-demand. For example, when a service request attempts to retrieve profile information for a particular networked device that has no match in real-time cache 540 or historical database 550, workflow engine 510 can execute commands at runtime to start a data collection process in a sub-network that the particular networked device belongs to. When workflow engine 510 receives the dynamically collected data from the data collectors in the sub-network, workflow engine 510 can aggregate the collected data and return the device profile information related to the particular networked device via a web service or web API in response to the service request.

Aggregator 520 generally aggregates device profile information. In particular, aggregator 520 aggregates attributes retrieved from networked devices, such as, IP addresses, MAC addresses, hostnames, etc., into at least one networked device profiles. The networked device profiles are then stored in a cache memory (e.g., an in-memory database), which can be retrieved by data consumers.

Analytical engine 530 can perform various analytics on the collected data and make the best informed decisions on which data entries correspond to the same persistent network identity. According to one aspect of the present disclosure, analytical engine 530 can analyze the collected data in partial networked device profiles, which are often inconsistent, and derive a persistent network identity for the networked device. For example, assuming that in a first data entry, the IP address 192.168.1.8 is associated with MAC address 1A-C0-00-9F-9D-4A. The first data entry includes a timestamp of 23:00:03. Moreover, in a second data entry, the IP address 192.168.1.8 is associated with hostname SVC. The second data entry includes a timestamp of 23:00:05. Because the difference between the timestamps of the first data entry and the second data entry is small (e.g., less than a predetermined time interval), analytical engine 530 can infer that the same IP address 192.168.1.8 is associated with the same networked device. Therefore, analytical engine 530 can generate a persistent network identity for this networked device. The persistent network identity includes at least an IP address of 192.168.1.8, a MAC address of 1A-C0-00-9F-9D-4A, and a hostname of SVC.

As another example, assuming that in a first data entry, the IP address 192.168.1.8 is associated with MAC address 1A-C0-00-9F-9D-4A. The first data entry includes a timestamp of 23:00:03. Moreover, in a second data entry, the IP address 192.168.1.8 is associated with MAC address 00-25-E5-E7-32-E9. The second data entry includes a timestamp of 23:30:05. Because the second data entry is later in time than the first data entry, and the first and second data entries include the same IP address but different MAC addresses, analytical engine 530 can infer that the IP address 192.168.1.8 has been reassigned to a different networked device. Therefore, analytical engine 530 can modify the persistent network identity for the networked device corresponding to the first data entry to remove the IP address 192.168.1.8. Also, analytical engine 530 can modify the persistent network identity for the networked device corresponding to the second data entry to include the IP address 192.168.1.8. Furthermore, analytical engine 530 can notify workflow engine 510 to start a data collection process in the sub-network associated with the networked device corresponding to the first data entry. As a result, the persistent network identity for the networked device corresponding to the first data entry is updated with the real-time IP address as soon as analytical engine 530 detects that the IP address of the networked device has been associated with a different MAC address.

According to one aspect of the present disclosure, analytical engine 530 can identify unique {IP address, MAC address, hostname} pairing information that is detected for the first time in the caches. Therefore, analytical engine 530 can identify a new device with this unique network identity. Then, analytical engine 530 can collaborate with aggregator 520 to create a list of all new devices identified in the network and periodically send the list to an administrator.

Moreover, analytical engine 530 can collaborate with workflow engine 510 to identify networked devices in a particular condition. For example, assuming that in a first data entry, the MAC address 1A-C0-00-9F-9D-4A is associated with an Ethernet port. The first data entry includes a timestamp of 23:00:03. Moreover, in a second data entry, the same MAC address 1A-C0-00-9F-9D-4A is associated with a wireless communication channel. The second data entry includes a timestamp of 23:30:05. Further, in a third data entry, the same MAC address 1A-C0-00-9F-9D-4A is associated with the Ethernet port again. The second data entry includes a timestamp of 23:30:06. Because the time interval between the first data entry and second data entry as well as the time interval between the second data entry and the third data entry are small (e.g., less than a predetermined threshold interval), analytical engine 530 can infer that a particular networked device corresponding to the same persistent network identity is in a condition that causes the particular networked device to change network connection between an Ethernet and a wireless local area network (WLAN) frequently. Accordingly, analytical engine 530 can report this unusual network activity related to the particular networked device to workflow engine 510, such that workflow engine 510 can start runtime processes to investigate this condition accordingly.

The conditions of networked device that can be detected by analytical engine 530 are not limited to network conditions. They may include other conditions, e.g., security conditions. For example, analytical engine 530 can collaborate with agents on domain controllers to determine a user corresponding to a particular networked device. In particular, analytical engine 530 can query the agents on various domain controllers for user identifiers associated with a particular networked device using the persistent network identity or a partial identifier. Assuming that the agents on the domain controllers collectively report three distinct user identifiers in response to the query, analytical engine 530 can report this unusual user activity related to the particular networked device to workflow engine 510, such that workflow engine 510 can start runtime processes to investigate this security condition accordingly.

It shall be noted that analytical engine 530 is not restricted to aggregating data about networked devices, analytical engine 530 also can generate and infer new metadata about networked devices. The generated and inferred new metadata then become a part of the networked device profile. This metadata can include any sort of additional information. For example, analytical engine 530 can generate new metadata that records the very first appearance of a particular networked device in the network based on a unique MAC address that was not previously detected in the network. Also, analytical engine 530 can generate statistics on how often an IP address and/or hostname associated with a particular networked device vary over a predefined time period. The statistics can be stored as metadata in either real-time cache 540 or historical database 550. In addition, analytical engine 530 can generate the geo-locations associated with a particular networked device in a predefined time period. In some implementations, analytical engine 530 collaborates with an external geo-database and correlates collected diverse data with data stored in the geo-database to generate or infer the new metadata. As such, analytical engine 530 allows real-time cache 540 and historical database 550 to be able to store metadata constructed from diverse data correlations and deductions over a long period of time.

Network device profiler 500 may include at least engines 510-530, which may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of network device profiler 500. In some examples, the at least one machine-readable storage medium may store instructions that, when executed by the at least one processing resource, at least partially implement some or all engines of network device profiler 500. In such examples, network device profiler 500 may include the at least one machine-readable storage medium storing the instructions and the at least one processing resource to execute the instructions.

In some examples, the instructions can be part of an installation package that, when installed, can be executed by the at least one processing resource to at least partially implement at least some of the engines of network device profiler 500. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on a networking device including the processing resource. In such examples, the machine-readable storage medium may include memory such as a hard drive, solid state drive, or the like. In other examples, the functionalities of any engines of network device profiler 500 may be at least partially implemented in the form of electronic circuitry.

Processes for Profiling of Networked Devices

Figure 6:
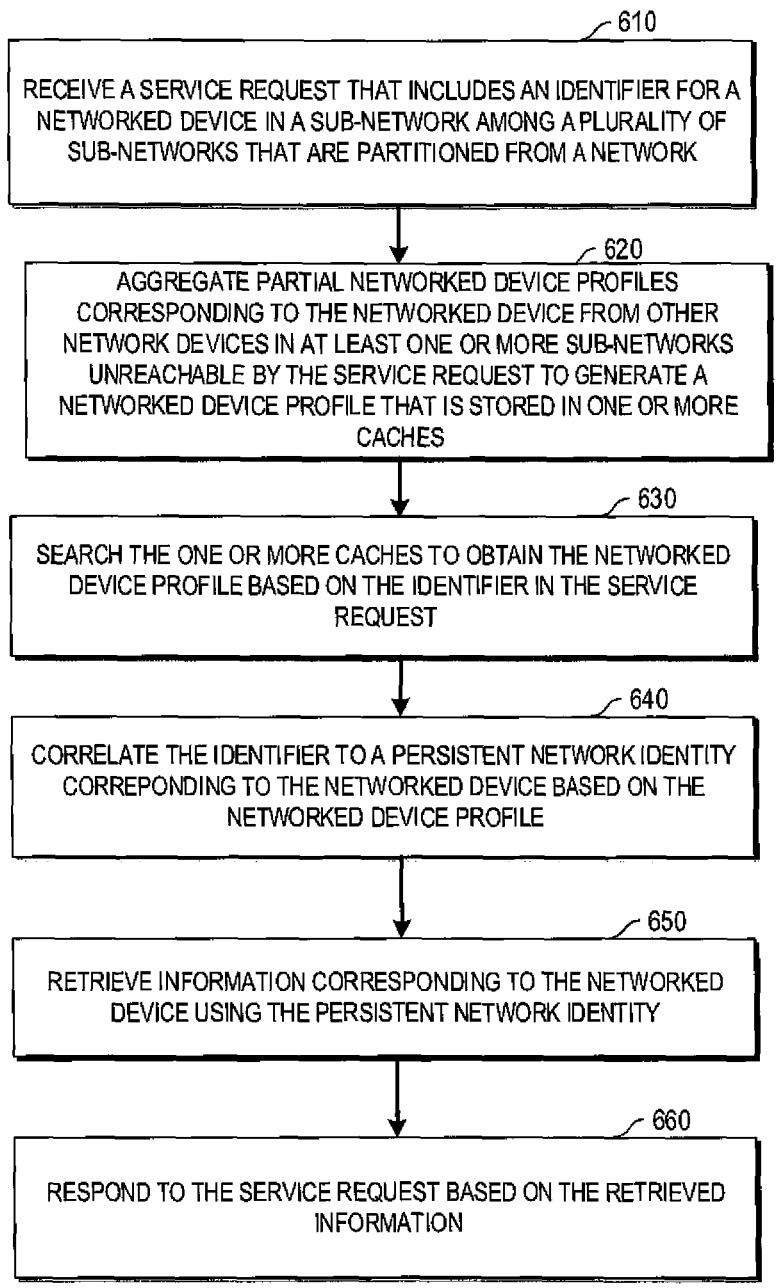
FIG. 6 is a flowchart of an example process for profiling of networked devices.

FIG. 6 is a flowchart of an example process for profiling of networked devices by a network device. A network device deployed with, e.g., network device profiler 500, may include any combination of hardware and programming to implement the functionalities of the engines described herein. Such combinations of hardware and programming may be implemented in a number of different ways, e.g., the programming for the engines may be processor-executable instructions stored on at least one non-transitory machine-readable storage medium and the hardware for the engines. During operations, the network device executing the example process can receive a service request that includes an identifier for a particular networked device in a sub-network among a plurality of sub-networks that are partitioned from a network (operation 610). The network device then aggregates partial networked device profiles corresponding to the particular networked device from other network devices in at least at least one sub-networks unreachable by the service request to generate a networked device profile (operation 620). The networked device profile is stored in at least one caches, including but not limited to, a real-time cache and/or a historical database. Thereafter, the network device searches the at least one caches to obtain the networked device profile based on the identifier in the service request (operation 630). Moreover, the network device correlates the identifier to a persistent network identity corresponding to the particular networked device based on the networked device profile (operation 640). Furthermore, the network device retrieves information corresponding to the particular networked device using the persistent network identity (operation 650). Then, the network device responds to the service request based on the retrieved information (operation 660).

In some examples, the identifier for the particular networked device is an Internet Protocol (IP) address that is assigned under a dynamic host configuration protocol (DHCP) for a limited period of time. Moreover, the same IP address is assigned to a different network device when the limited period of time expires.

In some implementations, the network device also collects diverse data associated with networked devices through a plurality of data collection engines. Then, the network device stores the diverse data in the at least one caches, and analyzes the diverse data to include information associated with the particular networked device in the networked device profile corresponding to the particular networked device. Here, the networked device profile includes at least the persistent network identity. The persistent network identity uniquely identifies the particular networked device across the plurality of sub-networks beyond the limited period of time. Furthermore, the persistent network identity corresponding to the particular networked device may be a media access control (MAC) address, a hostname, an Internet Protocol (IP) address, and/or a combination with any other device identifying information.

The at least one caches include at least a cache for current information that corresponds to at least an active data stream, and a cache for historical information that corresponds to at least a past data communication.

The partial networked device profiles are stored in hierarchical caches in the other network devices in the plurality of sub-networks. Also, other network devices periodically update the at least one caches on the network device with the partial networked device profiles via a secure port. The existence of the secure port does not permit networked devices in different sub-networks to reach each other (e.g. via a ping message).

In some implementations, the network device further synchronizes its own device clock time with the device clock time of other network devices in the plurality of sub-networks. Then, the network device associates a timestamp using synchronized device clock time with the attributes in the networked device profile.

In some implementations, the network device collects data that include attributes associated with the particular networked device via a Simple Network Management Protocol (SNMP) agent, an nslookup tool, or any other data collection tools.

The service request here may include, but are not limited to, a request for on-demand information about networked devices by end-users; a request for an event streaming service to annotate log events; a request for an analytics service to enrich information about the networked devices in the plurality of sub-networks; a request for an application service to enrich the information about the networked devices in the plurality of sub-networks; a request for access to historical information to support analysis of security threats that impact networked devices over a long period of time; etc.

In some implementations, the retrieved information includes bulk device profiling information in the at least one caches corresponding to a plurality of networked devices for a given period of time.

Figure 7:
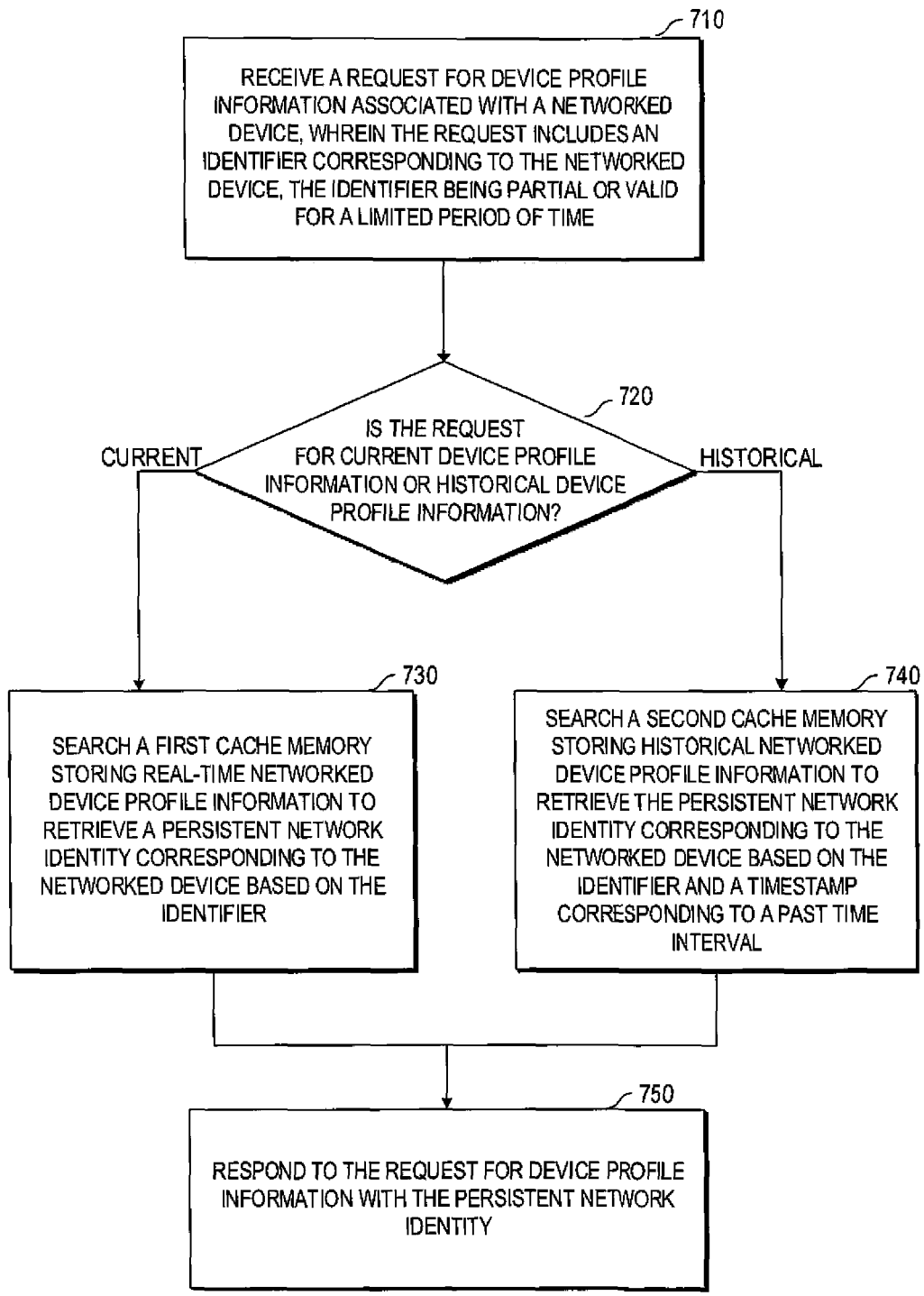
FIG. 7 is a flowchart of an example process for profiling of networked devices.

FIG. 7 is a flowchart of an example process for profiling of networked devices by a network device. A network device deployed with, e.g., network device profiler 500, may include any combination of hardware and programming to implement the functionalities of the engines described herein. Such combinations of hardware and programming may be implemented in a number of different ways, e.g., the programming for the engines may be processor-executable instructions stored on at least one non-transitory machine-readable storage medium and the hardware for the engines. During operations, the network device executing the example process can receive a request for device profile information associated with a particular networked device (operation 710). Here, the request includes an identifier corresponding to the particular networked device. The identifier is either partial or valid for a limited period of time. Then, the network device determines whether the request is for current device profile information or historical device profile information (operation 720). If the request is for current device profile information, the network device searches a first cache memory storing real-time networked device profile information to retrieve a persistent network identity corresponding to the particular networked device based on the identifier (operation 730). On the other hand, if the request is for historical device profile information, the network device searches a second cache memory storing historical networked device profile information to retrieve the persistent network identity corresponding to the particular networked device based on the identifier and a timestamp corresponding to a past time interval (operation 740). Thereafter, the network device responds to the request for device profile information with the persistent network identity (operation 750).

In some implementations, the network device determines if a match is found for the persistent network identity corresponding to the particular networked device in the first cache memory. If no match is found for the persistent network identity in the first cache memory, the network device instructs a workflow engine to initiate real-time data collection requests, and then aggregates attributes extracted from responses to the real-time data collection requests. Further, the network device can derive the persistent network identity from the aggregated attributes, and store the persistent network identity in the first cache memory storing real-time networked device profile information.

In some implementations, the network device determines if the request is for partial device profile information or full device profile information. If the request is for partial device profile information, the network device forwards the request to another network device in a sub-network of a plurality of sub-networks for further processing.

According to one aspect of the present disclosure, the network device synchronizes its own device clock time with the device clock time of other network devices in the network. Then, the network device associates a timestamp using the synchronized device clock time with a set of attributes in the current device profile information. Periodically, the network device removes the set of attributes from the current device profiling information; and adds the set of attributes and the timestamp to the historical device profile information.

Figure 8:
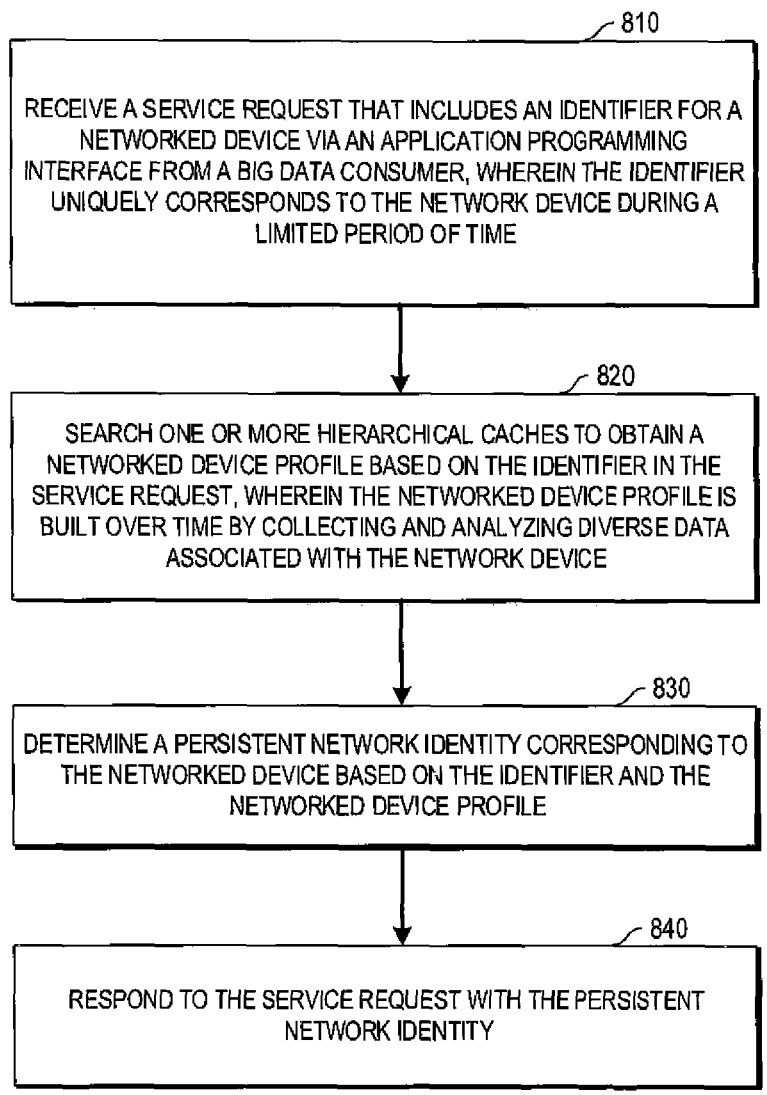
FIG. 8 is a flowchart of an example process for profiling of networked devices.

FIG. 8 is a flowchart of an example process for profiling of networked devices by a network device. A network device deployed with, e.g., network device profiler 500, may include any combination of hardware and programming to implement the functionalities of the engines described herein. Such combinations of hardware and programming may be implemented in a number of different ways, e.g., the programming for the engines may be processor-executable instructions stored on at least one non-transitory machine-readable storage medium and the hardware for the engines. During operations, the network device executing the example process can receive a service request that includes an identifier for a particular networked device via an application programming interface (API) from a big data consumer (operation 810). The identifier uniquely identifies the particular networked device during a limited period of time. Then, the network device searches at least one hierarchical caches to obtain a networked device profile based on the identifier in the service request (operation 820). Note that the networked device profile is built over time by collecting and analyzing diverse data associated with the particular networked device. Furthermore, the network device determines a persistent network identity corresponding to the particular networked device based on the identifier and the networked device profile (operation 830). Then, the network device responds to the service request with the persistent network identity (operation 840).

In some examples, each of the at least one hierarchical caches is deployed in a segment or a sub-network of a network. Also, the at least one hierarchical caches are extensible to a new segment of the network. In some implementations, the at least one hierarchical caches are modular, such that a particular cache in a first hierarchy may include a second hierarchy of caches.

Machine Readable Storage Medium for Networked Device Profiling

Examples described herein may be implemented by programs embedded in a non-transitory computer-readable storage medium (e.g., a programmable circuit; a semiconductor memory such as a volatile memory such as random access memory "RAM," or non-volatile memory, such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Figure 9:
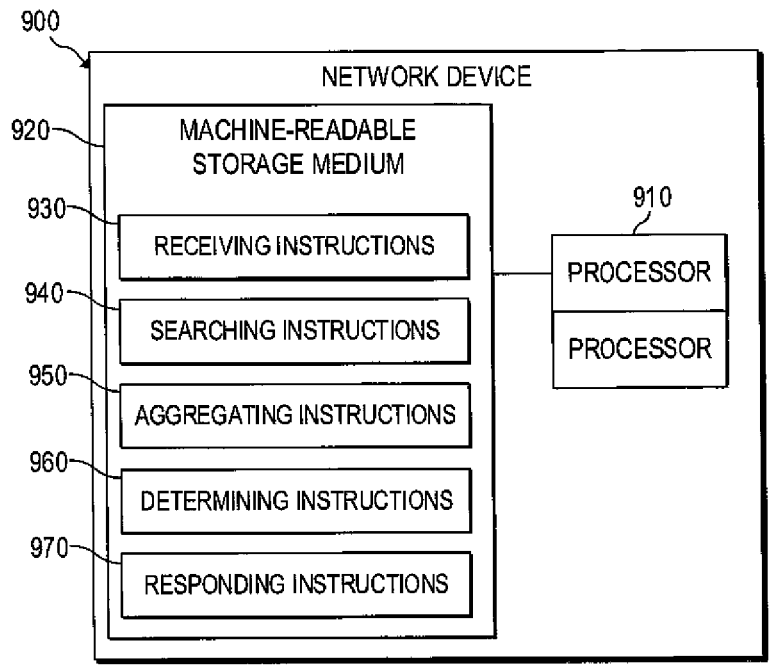
FIG. 9 is a block diagram of an example network device for profiling networked devices.

FIG. 9 is a block diagram of an example network device for profiling networked devices. Network device 900 generally includes a device suitable for transmitting and/or receiving network signals and for processing information within such network signals in order to provide network services to client devices, such as, an access point, a network switch, a router, a network controller, a server, a network data center, etc. As illustrated in FIG. 9, network device 900 includes at least one processors 910 and a machine-readable storage medium 920.

Processor 910 may be at least one central processing units (CPUs), CPU cores, semiconductor-based microprocessors, and/or other hardware devices suitable for retrieval and execution of instructions stored in machine-readable storage medium 920. Processor 910 may fetch, decode, and execute instructions 930, 940, 950, 960, and 970 to control the process for device profiling. As an alternative or in addition to retrieving and executing instructions, processor 910 may include at least one electronic circuits that include electronic components for performing the functionality of at least one of instructions 930, 940, 950, 960, and 970.

Machine-readable storage medium 920 may be any electronic, magnetic, optical, or other physical storage device that contains or stores executable instructions. Thus, machine-readable storage medium 920 may be, for example, Random Access Memory (RAM), an Electrically Erasable Programmable Read-Only Memory (EEPROM), a storage device, an optical disc, and the like. In some implementations, machine-readable storage medium 920 may be a non-transitory storage medium, where the term "non-transitory" does not encompass transitory propagating signals. As described in details below, non-transitory machine-readable storage medium 920 may be encoded with a series of executable instructions 930, 940, 950, 960, and 970 for receiving a service request; searching at least one caches; aggregating collected data; determining a persistent network identity for a particular networked device; responding to service requests; etc.

Specifically, receiving instructions 930 include instructions to receive a service request, which may include an identifier for a particular networked device in a sub-network among a plurality of sub-networks that are partitioned from a network. The identifier here uniquely corresponds to the particular networked device during a limited period of time. For example, the identifier could be an Internet Protocol (IP) address that is assigned under a dynamic host configuration protocol (DHCP) for the limited period of time. This IP address is then assigned to a different network device when the limited period of time expires.

In some implementations, the identifier may be a partial identifier that does not uniquely identify a networked device by itself. However, the partial identifier combined with other identifiers or device information may uniquely identify a networked device.

The at least one sub-networks of the plurality of sub-networks are unreachable by the service request. Moreover, the received service request may be a request for on-demand information about networked devices by end-users, a request for an event streaming service to annotate log events; a request for an analytics service to enrich information about the networked devices in the plurality of sub-networks, a request for an application service to enrich the information about the networked devices in the plurality of sub-networks; a request for access to historical information to support analysis of security threats that impact networked devices over a long period of time, etc.

Searching instructions 940 generally include instructions to search at least one caches. Specifically, searching instructions 940 may include instructions to search the at least one caches to obtain the networked device profile based on the identifier in the service request. Searching instructions 940 may also include instructions to retrieve information corresponding to a particular networked device using the persistent network identity.

In some implementations, if the received request is for current device profile information, searching instructions 940 may search the first cache memory to retrieve a persistent network identity corresponding to the second network device based on the identifier. If the received request is for historical device profile information, searching instructions 940 may search the second cache memory to retrieve the persistent network identity corresponding to the second network device based on the identifier and a timestamp corresponding to a past time interval.

Aggregating instructions 950 generally include instructions to aggregate collected data. Specifically, aggregating instructions 950 may include instructions to aggregate partial networked device profiles corresponding to a particular networked device from other network devices in at least one sub-networks unreachable by the service request to generate a networked device profile that is stored in at least one caches on network device 900.

In addition, aggregating instructions 950 may include instruct data collectors to collect diverse data associated with networked devices through a plurality of data collection engines. Data collection engines may collect data that include attributes associated with networked devices via a Simple Network Management Protocol (SNMP) agent, an nslookup tool, or any other data collection tools that can be used to collect device information.

Furthermore, aggregating instructions 950 may instruct analytical engine to analyze the diverse data and metadata to include information associated with a particular networked device in the networked device profile. The networked device profile includes at least a persistent network identity that is valid beyond a limited period of time.

In some examples, aggregating instructions 950 may include instructions to synchronize device clock time of network device 900 with other network devices in the plurality of sub-networks, and to associate a timestamp using synchronized device clock time with the attributes in the networked device profile.

Determining instructions 960 generally determines a persistent network identity for a particular networked device. In particular, determining instructions 960 can instruct processor 910 to correlate the identifier in a received service request to a persistent network identity corresponding to a particular networked device based on a retrieved networked device profile. The persistent network identity may a media access control (MAC) address, a hostname, and an Internet Protocol (IP) address.

In some implementations, determining instructions 960 can instruct processor 910 to determine if the request is for current device profile information or historical device profile information.

In some implementations, determining instructions 960 can instruct processor 910 to determine if a match is found for the persistent network identity corresponding to the second network device in the first cache memory. If no match is found for the persistent network identity in the first cache memory, determining instructions 960 can instruct a workflow engine to initiate real-time data collection requests. Attributes from responses to the real-time data collection requests are aggregated. Then, determining instructions 960 can instruct processor 910 to derive the persistent network identity from the aggregated attributes.

In some implementations, determining instructions 960 can instruct processor 910 to determine if the request is for partial device profile information or full device profile information. If the request is for partial device profile information, determining instructions 960 can instruct processor 910 to forward the request to another network device in a sub-network of a plurality of sub-networks.

Responding instructions 970 generally instruct processor 910 to respond to a service request based on a networked device profile or retrieved information from at least one caches. The retrieved information may include bulk device profiling information that corresponds to multiple networked devices in at least one distinct sub-networks over a period of time.

Network Device for Networked Device Profiling

Figure 10:
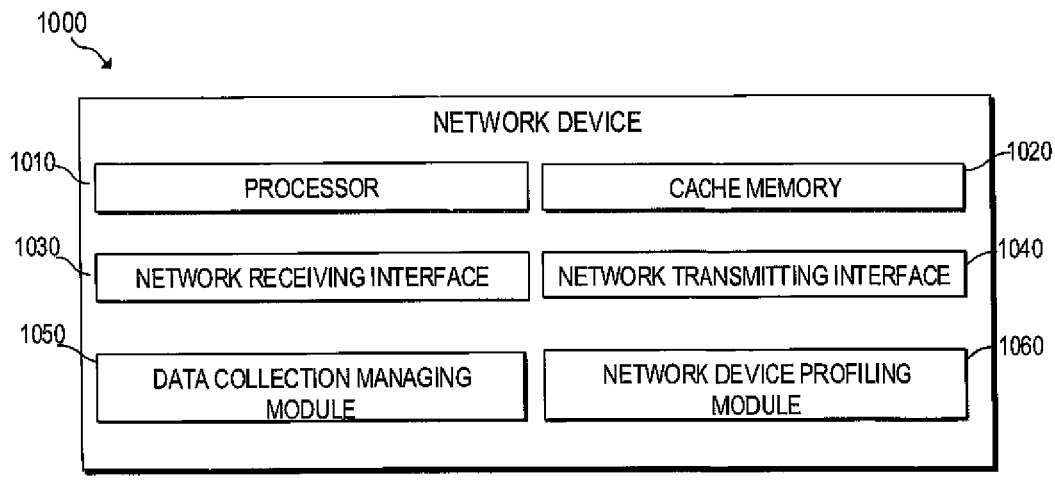
FIG. 10 is a block diagram of an example network device for profiling networked devices.

FIG. 10 is a block diagram of an example network device for profiling networked devices. As with network device 900 of FIG. 9, network device 1000 may be any electronic device suitable for transmitting and/or receiving network signals and for processing information within such network signals in order to provide network services to client devices, such as, an access point, a network switch, a router, a network controller, a server, a network data center, etc. As illustrated in FIG. 10, network device 1000 includes at least a processor 1010, a memory 1020, a network receiving interface 1030, a network transmitting interface 1040, a data collection managing module 1050, a network device profiling module 1060, etc.

In particular, processor 1010 can include at least one microprocessors and/or network processors. Memory 1020 can include storage components, such as, Dynamic Random Access Memory (DRAM), Static Random Access Memory (SRAM), etc.

Specifically, memory 1020 can store the diverse data in the at least one caches. The at least one caches may include a cache for current information that corresponds to at least an active data stream, a cache for historical information that corresponds to at least a past data communication, etc. Moreover, the at least one caches may be hierarchical caches in which partial or entire networked device profiles are stored. Other network devices in the network may periodically updates the at least one caches on the first network device with the partial networked device profiles via a secure port. In some implementations, each of the at least one hierarchical caches is deployed in a segment of a network. The at least one hierarchical caches could be modular such that a particular cache in a first hierarchy comprises a second hierarchy of caches. Also, the at least one hierarchical caches are extensible to a new segment of the network.

Network receiving interface 1030 generally receives network messages and/or packets, including but not limited to, a service request, a response, collected data, aggregated data, etc.

Network transmitting interface 1040 generally transmits network messages and/or packets, including but not limited to, a service request, a response, collected data, aggregated data, etc.

Data collection managing module 1050 generally collects data attributes associated with networked devices in a plurality of sub-networks. The collected data attributes include, but are not limited to, IP addresses, MAC addresses, hostnames, port identifiers, VLAN identifiers, network identifiers, etc.

Network device profiling module 1060 generally generates a device profile for networked devices. The device profile includes at least a persistent network identity that is valid beyond a limited period of time (e.g., the lease time for DHCP allocated IP addresses).

The foregoing disclosure describes a number of example implementations for networked device profiling. As detailed above, example implementations provide an intuitive, discoverable mechanism for device profiling across multiple sub-networks over a long period of time in the network. Additional implementations and advantages of such implementations may be apparent to those of skill in the art upon reading and understanding the foregoing description.

We claim:

1. A first network device comprising:
   at least one processor;
   a memory comprising instructions executable by the at least one processor to:
   receive a service request that includes an identifier for a second network device in a sub-network among a plurality of sub-networks that are partitioned from a network, wherein the identifier uniquely corresponds to the second network device during a limited period of time, and wherein at least one sub-network of the plurality of sub-networks is unreachable by the service request;
   aggregate partial networked device profiles corresponding to the second network device from other network devices in at least the at least one sub-network unreachable by the service request to generate a networked device profile that includes metadata information about the second network device;
   search at least one cache to obtain the networked device profile based on the identifier in the service request;
   correlate the identifier to determine a persistent network identity corresponding to the second network device based on the networked device profile;
   retrieve information corresponding to the second network device using the persistent network identity; and
   respond to the service request based on the retrieved information.

2. The network device of claim 1, wherein the identifier for the second network device comprises an Internet Protocol (IP) address that is assigned under a dynamic host configuration protocol (DHCP) for the limited period of time, and wherein the IP address is assigned to a different network device when the limited period of time expires.

3. The network device of claim 1, wherein the instructions further comprise instructions executable by the at least one processor to:
   collect diverse data associated with networked devices through a plurality of data collection engines;
   store the diverse data in the at least one cache; and
   analyze the diverse data to include information associated with the second network device in the networked device profile corresponding to the second network device, wherein the networked device profile comprises the persistent network identity.

4. The network device of claim 1, wherein the persistent network identity corresponding to the second network device comprises at least one of a media access control (MAC) address, a hostname, and an Internet Protocol (IP) address, and wherein the persistent network identity uniquely identifies the second network device across the plurality of sub-networks beyond the limited period of time.

5. The network device of claim 1, wherein the at least one cache comprises at least a cache for current information that corresponds to at least an active data stream and a cache for historical information that corresponds to at least a past data communication.

6. The network device of claim 1, wherein the partial networked device profiles are stored in hierarchical caches in the other network devices in the plurality of sub-networks; and wherein the other network devices periodically update the at least one cache on the first network device with the partial networked device profile via a secure port.

7. The network device of claim 1, wherein the instructions further comprise instructions executable by the at least one processor to:

synchronize device clock time of the first network device with the other network devices in the plurality of sub-networks;
collect data that include attributes associated with the second network device via at least one of an Simple Network Management Protocol (SNMP) agent and an nslookup tool; and
associate a timestamp using synchronized device clock time with the attributes in the networked device profile.

8. The network device of claim 1, wherein the service request comprises a request for at least one of:
on-demand information about networked devices by a plurality of users;
an event streaming service to annotate log events;
an analytics service to enrich information about the networked devices in the plurality of sub-networks;
an application service to enrich the information about the networked devices in the plurality of sub-networks; and
access to historical information to support analysis of security threats that impact networked devices over a long period of time.

9. The network device of claim 1, wherein the retrieved information comprises bulk device profiling information in the at least one caches for a given period of time.

10. A first network device comprising:
a first cache memory storing real-time networked device profile information;
a second cache memory storing historical networked device profile information;
at least one processor; and
a memory comprising instructions executable by the at least one processor to:
receive a request for device profile information associated with a second network device, wherein the request includes an identifier corresponding to the second network device, the identifier being partial or valid for a limited period of time;
determine if the request is for current device profile information or historical device profile information;
in response to the request for current device profile information, search the first cache memory to retrieve a persistent network identity corresponding to the second network device based on the identifier, wherein the persistent network identity is valid beyond the limited period of time;
in response to the request for historical device profile information, search the second cache memory to determine the persistent network identity corresponding to the second network device based on the identifier and a timestamp corresponding to a past time interval; and
respond to the request for device profile information with the persistent network identity.

11. The network device of claim 10, wherein in response to the request for current device profile information, the at least one processors further to:
determine if a match is found for the persistent network identity corresponding to the second network device in the first cache memory;
in response to no match being found for the persistent network identity in the first cache memory, instruct a workflow engine to initiate real-time data collection requests;
aggregate attributes from responses to the real-time data collection requests;
derive the persistent network identity from the aggregated attributes; and
store the persistent network identity in the first cache memory storing real-time networked device profile information.

12. The network device of claim 11, wherein the at least one processors further to:
determine if the request is for partial device profile information or full device profile information; and
in response to the request for partial device profile information, forward the request to a third network device in a sub-network of a plurality of sub-networks.

13. The network device of claim 11, wherein the at least one processors further to:
synchronize device clock time of the first network device with other network devices in a network;
associate a timestamp using the synchronized device clock time with a set of attributes in the current device profile information;
remove the set of attributes from the current device profiling information; and
add the set of attributes and the timestamp to the historical device profile information.

\* \* \* \* \*